Aug. 8, 1939.  C. R. BLUM  2,168,467
PHONORHYTHM PROCESS AND APPARATUS FOR CARRYING IT OUT
Filed Jan. 20, 1936  3 Sheets-Sheet 1

Inventor:
Carl R. Blum
By Sommers + Young
Attys

Aug. 8, 1939.　　　　　C. R. BLUM　　　　　2,168,467
PHONORHYTHM PROCESS AND APPARATUS FOR CARRYING IT OUT
Filed Jan. 20, 1936　　　　3 Sheets-Sheet 2
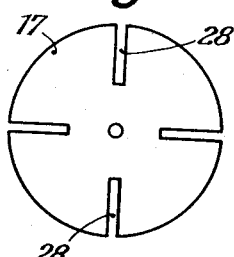
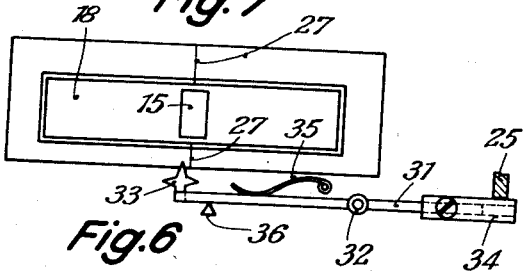
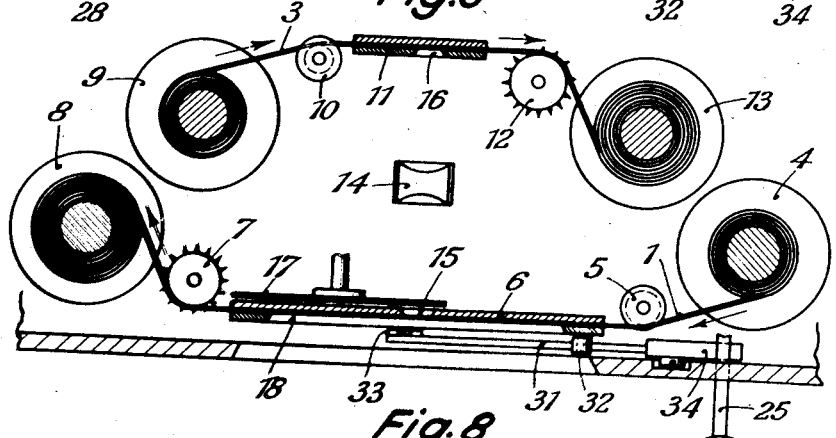
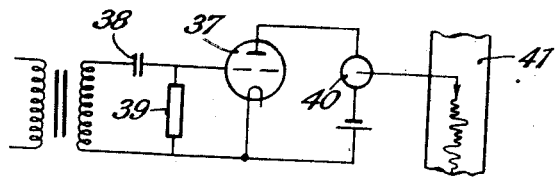
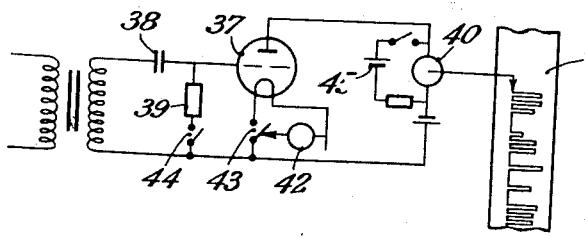
Inventor:
Carl R. Blum,
By Sommers & Young
attys Patented Aug. 8, 1939

2,168,467

UNITED STATES PATENT OFFICE 2,168,467

PHONORHYTHM PROCESS AND APPARATUS FOR CARRYING IT OUT

Carl Robert Blum, Berlin-Marienfelde, Germany

Application January 20, 1936, Serial No. 59,957
In Germany January 30, 1932

12 Claims. (Cl. 88—16.2)

The present invention relates to the production of cinematograph films with synchronized sound and particularly to a method of preparing a readily readable guide showing the interpretation or rendition that is to be given by an actor to a written text such as words or music or both.

As is well known, in various sound and motion picture recording processes now employed and hitherto proposed the pictures and sounds are recorded separately both in respect to time and place and the synchronism between the two records obtained by the aid of rhythm bands on which the musical signs or speech signs are first recorded.

Hitherto it has generally been the practice for the picture film to be produced first and for the rhythm bands to be employed to prepare subsequently the sound record.

Such rhythm bands are well known and consist usually of paper, Celluloid or other suitable material on which are written words, musical notes or other indicating marks, the distance therebetween or the length thereof representing the duration of the sound, so that on passing the band at a constant speed below an index mark an accurate indication of the time at or during which a particular note or sound should be produced or prolonged is indicated.

A rhythm band has also been allotted to each actor so that a plurality of rhythm bands were in use at the same time, which bands had to be run in synchronism with one another and with the film on which the sound is to be made. This method is equally applicable to sound recording systems in which the sound track or phonogram is recorded on a disc.

While the aforementioned methods have been successful to a certain extent they usually do not overcome certain difficulties which are met when the word sequence of a cinematograph film has to be translated into a foreign language. In such cases, according to the so-called after-synchronization method, the original word text is translated into the desired foreign language using words which coincide with the original actor's facial and lip movements. The translated text is then read and recorded to produce a sound track or phonogram which is printed on to the picture sequence positive in synchronism with the movements of the actor appearing therein. As a guide to the person reading the translated text, it has, as already stated, been proposed hitherto to use rhythm bands prepared dependently on the picture sequence, but considerable difficulty has been encountered in satisfactorily effecting close synchronization between the translated text and the picture record.

An object of this invention is to overcome these difficulties, and is based on the discovery that words can be found in any language to express the desired thought and which can be brought into a synchronous rhythm which will agree syllable by syllable with the facial movements necessary to speak the corresponding words in any language.

Of particular importance is the visible and permanent recording of the general rhythm of the text in the different languages on a carrier which can serve as guiding means for synchronous recordings or reproductions, or recording and reproductions of further sound and movement processes.

According to the invention, the simplified production of multiple speech interpretations or versions of a sound film takes place in detail for example as follows:

In the production of a picture sound film according to the invention, first a metric band is produced having the syllables of the text inscribed thereon at equal spacing regardless of the time that might be required for speaking the various syllables. From this metric band, initial rhythm bands in different languages are produced with the syllables spaced with an arbitrary but natural rhythm. Based on these initial rhythm bands, by comparison of the reflections or projections of the faces of persons speaking the text in the different languages, a general rhythm band is produced which corresponds to the rhythm in common in all languages and represents the guiding motive for the sound recording, and possibly also for the picture recording. Picture and sound can then be printed on a common carrier or be shown separately in synchronism.

The picture can be taken and the sound recorded in the general predetermined rhythm with simultaneous production of a general or master rhythmogram and after cutting the picture film which is carried out with the assistance of the general rhythm band produced according to the general rhythmogram, and the sound recording is also similarly controlled. While the pictures are being taken, the actors may act freely and without constraint but the text of the general rhythm band is used. During the picture taking, a master rhythm band or an auxiliary phonogram can also be made. The latter can be made alone or simultaneously with one of the above-mentioned control members. The auxiliary phonogram will, in the further course of the process, be converted into rhythm bands.

The writing and control work and the like necessary for producing the initial rhythm bands is preferably carried out on a rhythmoscope. This is an auxiliary apparatus which permits two or more bands to pass a common standard mark synchronously or, if necessary, also over a screen which may be transparent. In this, one of the bands can be a corresponding picture film which can be run off in a suitable transmission ratio more rapidly than the bands to be dealt with. Such bands can also be subjected to a score-like optical synchronous control with respect to the rhythmic and phonetic agreement of the individual rhythm bands or of all those corresponding to a production unit by means of the rhythmoscope.

A further visual control of the different language rhythm bands and thus the phonorhythmic text adaption necessary for the production of the general rhythm takes place in the following manner: All the bands, or a single band with a number of speaking parts, pass, in known manner, by means of a projection rhythmonome, a standard mark simultaneously and the several texts inscribed thereon are read in the language in which they occur and reflected, or projected, or shadow pictures of the face movements and preferably the lip movements of persons reading the bands are brought close together in position for comparison of synchronism. In this way the visual control of the text takes place by the kinematic representation of the phonetic movements. This takes place preferably in two versions simultaneously, in front view and in profile. These strips are corrected as to the spacing allotted to corresponding syllables in the various languages, or even the words employed may, if necessary, be changed, until the facial speaking movements of the readers are synchronized as closely as possible. The synchronized timing strip or general rhythm band thus obtained may then be used as the time control element for controlling the speaking during the filming of the action, and the speaking facial movements of the actors will synchronize with the sound regardless of what language is spoken by the actor during the production or no matter what language sound strip is afterwards used in conjunction with the picture film.

The general rhythmogram obtained when the facial speaking movements of the readers are brought into synchronism may also be employed as the control element for the production of sound strips in other languages than those employed in the production of the general rhythmogram or the action picture strip.

The cutting of the picture, and this at first only by rough cutting, takes place according to the general rhythm band corresponding to the picture film preferably in such manner that, simultaneously with the projection of the picture film, the rhythm band is made to run off in synchronism in the rhythmonome. The film director marks, based on the picture projection, by means of the rhythmograph, and on the rhythm band synchronously running off, the intended cutting places for the film. The film is then only cut when, by repeated controls, the intended cutting places being indicated during the uninterrupted running off of the two bands, by dark pauses in the projection—the cutting places are exactly determined.

The exact cutting of the picture film is carried out by acoustical control. To this end, simultaneously with the showing of the picture, the corresponding tone sequence is made audible which at a different place, for example as sound tests also, is actually and personally performed according to the corresponding rhythm band running synchronously therewith and is transmited through microphone, amplifier and loudspeaker, or headphone, into the admission room. The film director has thereby the total impression of picture and sound, that is, the effect of a finished sound film, even before the taking of the sound.

In this way it is possible, even before the finishing of a sound film, to show the picture sequence along, with the impression of a finished sound film to the censor and other interested parties, in order to meet their wishes by slight and cheaply carried out alterations.

After finishing the cutting of the picture and the sound test, or the acoustical control of the picture film, there takes place the final sound production according to the general rhythm band belonging to the picture film in the desired language, preferably corresponding to the country for which the version is intended.

The method according to the present invention can also be used in order to prepare from an existing sound and picture film a version in a different language. In this case the sound sequence of the sound and picture film is used for making a rhythmogram, that is, a registration of a rhythm in signs, which is then worked up into a rhythm band. This is the initial rhythm band. The translations are then prepared as above described and by means of the said visual control the necessary alterations of the words in the separate languages are made. In so far as alterations of words must be made in the original language, the picture sequence is correspondingly altered and inserted in the original picture sequence. There is thus obtained a picture sequence to which sound records in a number of different languages may be readily adapted.

In the accompanying drawings:

Fig. 5 shows a shutter in the apparatus of Fig. 3;

Fig. 6 is a plan view of a special shift arrangement in the apparatus of Fig. 3;

Fig. 7 is a front elevation of the switch arrangement of Fig. 6; and

Fig. 8 is a wave form obtained by the electric circuits of Figs. 9–15 which diagrammatically show circuits for obtaining rhythmograms as will be hereinafter explained.

Figure 1:
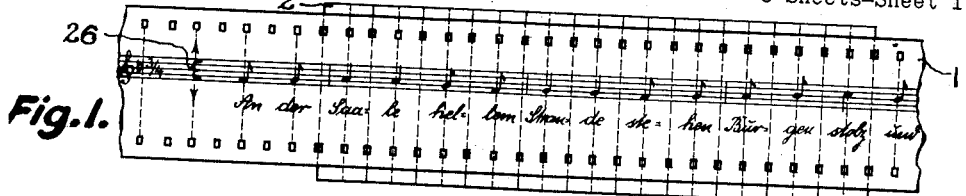
Fig. 1 shows a metrically inscribed band over a pattern for an inscription.

Referring now to the drawings, Fig. 1 shows a strip 1 of transparent material such as cinematograph film stock having the usual sprocket holes on each side.

The strip is marked with equally spaced parallel vertical lines each indicating the center of a section. The words of the original text to be inscribed on the strip are divided into syllables and inscribed on the strip, together, if necessary, with musical notes by any convenient method in a manner such that the vowels and corresponding principal notes or notes on which tonic accents fall, are located in the center of each section, that is to say, on the vertical lines as may be clearly seen from the figure.

One means by which the strip may be inscribed comprises a screen template 2 of matted glass having lines similar to those on the strip, etched thereon as a guide. The template is preferably let into a working table and illuminated from below. By passing the strip over the screen template ample illumination may be obtained so that the words and notes may be written on the strip as with a pen and ink. In the case of music, the strip may previously be printed with staff lines.

When the strip has been inscribed, it comprises what is herein termed a "metric band."

Figure 3:
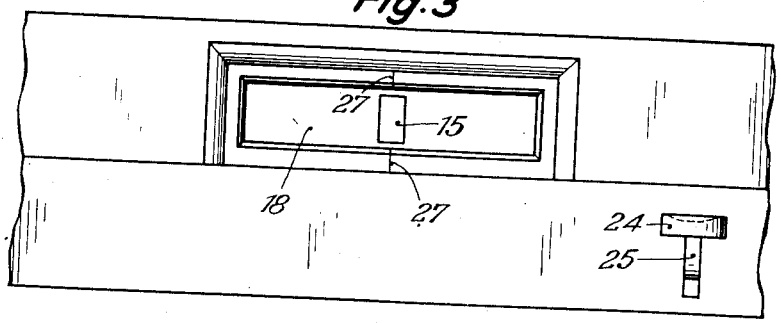
Fig. 3 is a front elevation of an apparatus for the production of rhythmically inscribed bands from metrically inscribed bands by the photographic method.
Figure 4:
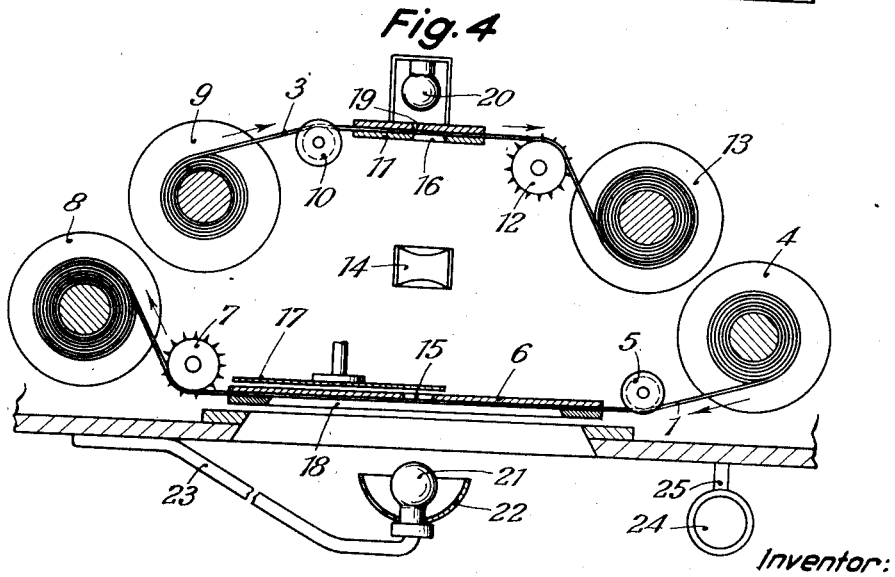
Fig. 4 shows details of the apparatus of Fig. 3.

The metric band when completed is passed through the apparatus shown in Figs. 3–7 of which Figs. 3 and 7 show front views of two forms while Figs. 4 and 6 show plan views.

In the apparatus shown by front view in Fig. 3, and in plan view in Fig. 4, the band 1 with metrical writing is moved forward from the winding-off disc 4 over the guide roller 5 through the film guide 6 over the driving roller 7, adapted to be driven intermittently by actuation of key 24 as hereinafter indicated, to the winding-on disc 8. A blank strip of photo-sensitive material such for example as an unexposed cinematograph film is passed at constant speed from the winding-off disc 9 over the guide roller 10 through the film guide 11 over the driving roller 12, to the winding-up disc 13.

Between the film guides 6 and 11 is arranged the objective 14 and in such manner that its optical axis passes through the filament of the source of light 21 and through the center of the two apertures 15 and 16 provided respectively in the guides 6 and 11. The window-like aperture 15 is closed on the inside by the rotating shutter 17 provided with radial slots 28 (see Fig. 5) and adapted to be operated from a lever 25 carrying a key 24. Towards the outside, the film guide 6 has an aperture 18 extending almost over its entire length, and is provided in the direction of the vertical central line of the aperture 15 with the guide marks 27 at the top and bottom.

There is preferably made directly on the left-hand edge of the window 16 in the rear wall of the film guide 11, a small point-like aperture 19 behind which is located an enclosed source of light 20 for the band 3 to be exposed for a purpose to be hereinafter explained. Opposite the window 18 is arranged the source 21 of the projection light with the reflector 22 on an arm 23.

In Fig. 5 the shutter 17 with its radial slots 28 is shown in front view.

Figure 2:
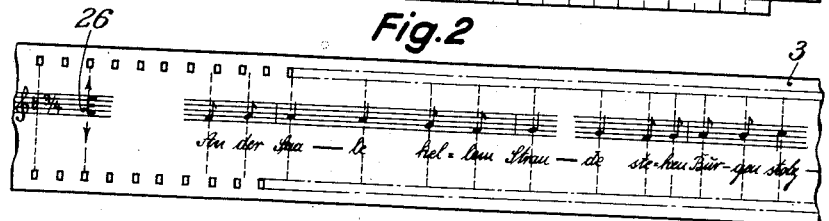
Fig. 2 shows a band with the initial rhythmical inscription.

After the metrical band 1 has been so tensioned that the starting sign 26—see Figs. 1 and 2—is directly in the aperture 15, and after the driving mechanism (not shown) for the band 3 has been started, the actuation of the key 24 is commenced. With each depression of the key, the shutter 17 is actuated by a quarter of a revolution, and allows a momentary passage of light. The light-sensitive band 3 runs forward with constant speed during the whole working process.

On the return movement of the key 24 the metrical band 1 is moved forward by one division to the left.

In the preparation of an initial rhythm band from the metric band by means of the apparatus just described, the operator actuates the key 24 in a rhythm determined by the rhythm in which he or another technician reads the text on the metrical band as it passes the guide mark. The text is read naturally without any attempt of dramatic effect being given to the words. If the text is in musical notation, the key 24 is operated in a rhythm as determined by a person singing or playing the text. If the operator is musically trained sufficiently to read the music without someone else playing or singing, he may operate the key according to his own interpretation. It is to be particularly noted that at this stage the rendering of the passages on the metric band are in a more or less arbitary manner.

The production of the master rhythm band may be similarly effected by this apparatus but instead of using the metric band as prepared from the original text, a metric band is used prepared from the text corrected in accordance with the basic rhythm band.

Furthermore, by a longer depression of the key 24, the source of light 20 can be placed under current by means of a slow acting element. The result is thereby attained that with long sustained vowels, sounds or noises, there is supplementarily applied by photography a horizontal line on the blank band 3. After the exposure, there is obtained by developing and fixing of the strip 3, a negative from which by copying, positives as shown in Fig. 2 can be made.

As will be seen, nothing is altered in the size of the writing although there is in the distance apart of the individual syllables, notes and other signs from each other. These distances indicate the rhythm in which the speech, song, music or the noises have been carried out in the production of this rhythm band.

The band 1 may be of a wider size in order to copy a number of roles or voices or versions of text in different languages in separate divisions. In this case, it is advisable to effect a photographic reduction on the band 3 in order to utilize this enlarged by projection.

Instead of controlling the apparatus manually, it may be controlled electrically by sound currents generated in any suitable manner as by direct sound and a microphone, by a sound track of recorded sound and appropriate photoelectric, electro-magnetic or like pick-up device or by a rhythmogram prepared as described with reference to Figs. 9–15. Such sound currents are amplified in a preliminary amplifier by thermionic valves arranged in a suitable circuit to give the valves a characteristic curve such that the weakest signal currents are amplified most while the strongest currents are only amplified to a predetermined maximum limit. The amplified currents are then rectified to produce direct current pulses by which a relay may be actuated. This relay operates the mechanism for intermittently stepping forward the metric band in the apparatus of Figs. 3–5.

Particular examples of suitable circuits for the rectifying stage are shown in Figs. 9–15 in which the relay is indicated by the reference character 40. This relay may be used to actuate the apparatus as already stated or may be used to actuate a current recording device as will be referred to later. The particular type of current recording resulting from each of the circuits is shown in Figs. 9–14.

Fig. 9 shows the fundamental diagram of an impulse indicator. It consists of a valve 37, the grid circuit of which includes a series condenser 38. The condenser is shunted by a high resistance 39 which may, if desired, be formed by the actual insulation resistance of the condenser. The relay 40 is in the anode circuit of the valve, and may as already stated be in the form of a current recorder. The condenser 38 is charged by incoming alternating current impulses up to the peak potential and effects thereby a corresponding influencing of the anode current flowing through the relay 40, which actuates the mechanism of the apparatus shown in Figs. 3-5 in a similar manner to that in which it was manually operated by the depression of lever 25. In this case however control is effected directly by the speech currents since the input of the circuits shown in Figs. 9-15 are connected to the output of a microphone amplifier circuit, a pick-up amplifier and so forth as the case may be.

Instead of the above arrangement the relay may actuate a recording pen of a current recorder which marks on a band 41 unwinding by means of clockwork or the like, the amplitude of the incoming alternating current in the curve or course somewhat varied by the condenser, for example, according to the curve II of Fig. 8 (in this figure, the curve I would correspond to the course of the current according to the above described device with simple rectification). The markings on the band 41 constitute the rhythmogram.

The sharp corners occurring give the possibility of subsequently exactly determining the rhythm of the spoken word or respectively the sound.

The duration of the impulse is dependent on the relative values of the condenser 38 and of the resistance 39. A small value of the condenser is preferable in order to effect a rapid charging up to the peak potential, but too small a value is a disadvantage, since the time retardation depends upon the product C. R. (condenser-resistance).

In Fig. 10 is shown a device which gives a still plainer representation of the rhythmogram. In this device there is provided an automatic interrupter 42, 43, 44 which at particular intervals of time from, for example, one-half to one twenty-fourth of a second, shunts the condenser through a resistance 39, in this case kept comparatively small. In this arrangement the condenser after it has been charged up to the peak potential of the incoming impulses, retains its charge for a predetermined time, for example, for one-half to one twenty-fourth of a second, and thus causes the recorder to make a mark corresponding to the peak. If the incoming potential is still at the same high value, after the automatic interrupter contact 44 is again released, the recorder continues to mark the high value. If however, the potential has in the meantime varied, a deflection takes place corresponding to the altered potential. The markings are substantially as shown on the film band 41 in the figure.

To avoid loading the current recording device by the closed or feed current, there can be provided, as is also shown in Fig. 10, an auxiliary battery 45 with a series resistance which allows a current to flow through the current coil, this current being opposite to the original anode current.

Figure 11:
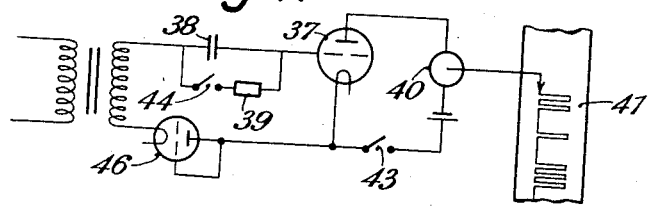

A further possibility of keeping the current in the current coil low is shown by Fig. 11. Here, a separate rectifier is arranged in the grid circuit of the impulse valve 37, which rectifier may take the form of a valve 46. The rectifier is of such polarity that the rectified potential supplied to the grid of the valve 37 is positive, so that with impulses occurring the anode current of the valve rises instead of, as in the previously described cases, being reduced.

In the example of Fig. 11, there is provided in the anode circuit a relay 40 which can only be deflected between two limiting positions. The recorded rhythmogram has consequently deflections of always the same amount. Furthermore, the circuit is so arranged that the relay 40 also actuates the interrupter for the switching in and off of the discharge resistance 39. The position shown corresponds for example to the position of rest in which the relay 40 is without current. When an impulse arrives, the grid potential is shifted so far into the positive range that the relay 40 operates. In this case, the recording device marks an impulse, but passes immediately back into its initial position in consequence of the interruption of the contact 43, while at the same time in this operation the contact 44 has discharged the condenser 38. If after the contacts 43 and 44 have moved back into their standard position, there is no longer any incoming impulse, the relay remains in its position of rest, otherwise the cycle of responding and dropping would be repeated until the incoming impulse has become sufficiently small.

Figure 12:
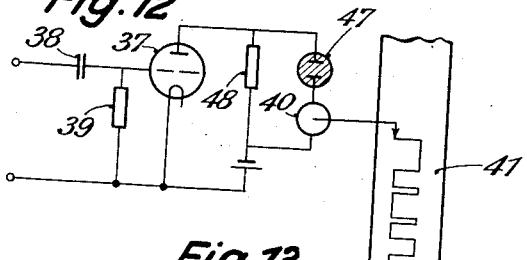

A further embodiment is shown in Fig. 12. In this circuit, a glow discharge lamp 47 is used which is connected in the anode circuit in series with the relay 40 parallel to an anode resistance 48. If the incoming impulses are sufficiently high, the potential at the glow discharge tube 47 falls and the relay 40 drops.

Figure 13:
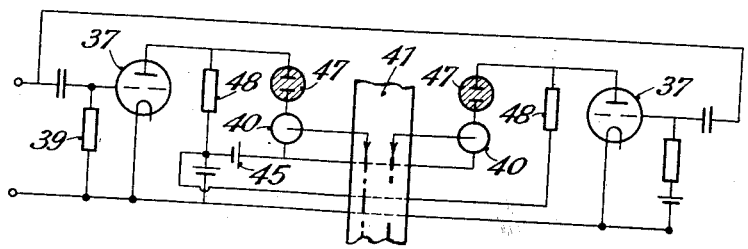

If, according to Fig. 13, two glow discharge tubes are used, each of which is actuated by an impulse valve, it is possible by suitable dimensioning of the anode resistances 48 to let the glow discharge tube respond at different amplitudes of the input potential, and thus to attain a double indication for very high amplitudes (main accents). In this way, the utilization of the rhythmogram is facilitated.

The rhythmogram which is written in the embodiment according to Figs. 9-11 in the form of a wavy line, can naturally as shown in Fig. 13 be recorded simply in the form of short or long strokes. The latter is particularly advisable with the recording with two different recording pens, corresponding to Fig. 13.

Figure 14:
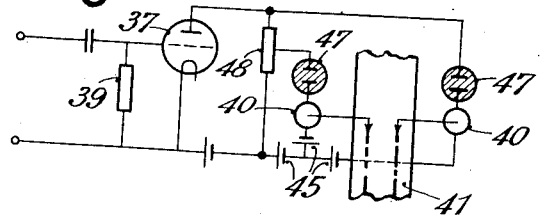
Figure 15:
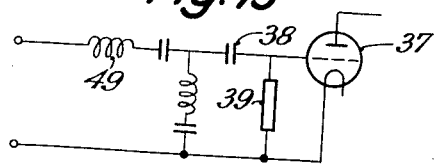

Instead of being connected to two separate valves, the flow discharge tubes according to Fig. 14 can also be connected to two different points of the anode resistance 48 of a single valve. Auxiliary batteries 45 can serve with the arrangement according to Figs. 13 and 14 to vary the ignition potential of the glow discharge tubes and in particular to reduce it. Instead of glow discharge tubes it is possible to provide thermionic valves upon the control grid of which the incoming impulses are impressed.

In many cases, it may furthermore be of advantage to differentiate the amplitudes of the sound band according to their frequency, when, for example beats on a drum, are to be particularly emphasized or, on the contrary, suppressed. This case is shown diagrammatically in Fig. 15 by a filter chain 49 in the input line of the impulse valve.

For the recording of a very rapidly changing rhythm, where a mechanical indicator would not follow sufficiently quickly, a Braun tube can be used.

It will, of course, be understood that where a rhythmogram is used to control the apparatus of Figs. 3-5 it is not essential to use circuits such as those of Figs. 9-15 and any known convenient amplifying circuit may be used for actuating relay 40.

Means may also be provided for marking the position on the general rhythm band where undesired or disturbing noises occur. Suitable means for this purpose are illustrated in Figs. 6 and 7. The lamp 20 may also be used for this purpose.

In the arrangement shown in Figs. 6 and 7 the lever 25 remains at rest during the automatic actuation of the apparatus by the relay 40 or other equivalent mechanism. Normally lever 25 acts on a removable extension piece 34 on one end of lever 31 pivoted at 32 and carrying at its other end a star 33 adapted on mechanical actuation of lever 25 to be moved into the path of the rays. The lever 31 is pressed against the stop 36 by means of a spring 35.

When in the case of undesired or disturbing noises or sounds, the lever 25 is actuated, the lever 31 is moved and thereby the star 33 is moved into the path of the rays and is photographed on the band 3 to indicate the place of correction.

A particular advantage of the present invention in the cinematographic art resides in the fact that foreign translations may be prepared and compared for synchronism of rhythm with the original before any picture sequence is photographed.

I claim as my invention:

1. In a method of producing cinematograph films with synchronized sound and action for a plurality of languages the steps comprising forming an initial rhythm band by inscribing on a band the syllables of a text in one language, spaced to indicate an arbitrary but natural rhythm and tempo and then on the same band corresponding texts in foreign languages with syllables spaced similarly as the first language inscribed on the initial rhythm band, secondly forming a basic rhythm band by passing the initial rhythm band past a guide mark at a uniform speed while each text is simultaneously being read by a person in the language in which the text is written, comparing for synchronism and coincidence the facial movements of the persons reading the texts, suitably marking the bands where lack of synchronism occurs, correcting the texts and initial rhythm band at such marked parts, repeating the steps of comparison and correction until the aforesaid facial movements coincide and synchronize, thirdly forming a master rhythm band by recording the rhythm and tempo of one person's interpretation of the corrected text in one language simultaneously with the taking of the picture sequence and inscribing the words of at least one other text on a band with syllables variable spaced as determined by the last said rhythm and tempo, and finally passing the master rhythm band with one of the other texts past a guide mark at a constant speed and recording such other text whereby the speech of a person reading the said other text will synchronize with the movements of the person in the picture sequence.

2. In a method of producing cinematograph films with synchronized sound and action for a plurality of languages the steps comprising forming an initial rhythm band by inscribing on a band the syllables of the texts of several actors which constitute independent sound sequences in any language, the inscribed syllables being spaced to indicate an arbitrary but natural rhythm and tempo and then on the same band corresponding texts in language foreign to that initially inscribed with syllables spaced as on the initial rhythm band, secondly forming a basic rhythm band by passing the initial rhythm band past a guide mark at a uniform speed while each text is simultaneously being read by a person in the language in which the text is written, comparing for synchronism and coincidence the facial movements of the persons reading the texts, suitably marking the bands where lack of synchronism occurs, correcting the texts and initial rhythm band at such marked parts, repeating the steps of comparison and correction until the aforesaid facial movements coincide and synchronize, thirdly forming a master rhythm band by recording the rhythm and tempo of one person's interpretation of the corrected text in one language simultaneously with the taking of the picture sequence and inscribing the words of at least one other text on a band with syllables variably spaced as determined by the last said rhythm and tempo, and finally passing the master rhythm band with one of the other texts past a guide mark at a constant speed and recording such other text whereby the speech of a person reading the said other text will synchronize with the movements of the person in the picture sequence.

3. In a method of producing cinematograph films with synchronized sound and action for a plurality of languages the steps comprising forming an initial rhythm band by inscribing on a band the syllables of a text in one language, spaced to indicate an arbitrary but natural rhythm and tempo and then on separate bands corresponding texts in foreign languages with syllables spaced similarly as on the first language inscribed on the initial rhythm band, secondly forming a basic rhythm band by passing the initial rhythm band past a guide mark at a uniform speed while each text is simultaneously being read by a person in the language in which the text is written, comparing for synchronism and coincidence the facial movements of the persons reading the texts, suitably marking the bands where lack of synchronism occurs, correcting the texts and initial rhythm band at such marked parts, repeating the steps of comparison and correction until the aforesaid facial movements coincide and synchronize, thirdly forming a master rhythm band by recording the rhythm and tempo of one person's interpretation of the corrected text in one language simultaneously with the taking of the picture sequence and inscribing the words of at least one other text on a band with syllables variably spaced as determined by the last said rhythm and tempo, and finally passing the master rhythm band with one of the other texts past a guide mark at a constant speed and recording such other text whereby the speech of a person reading the said other text will synchronize with the movements of the person in the picture sequence.

4. A method according to claim 1 and filming the action picture sequence and sound with the sound controlled according to the master rhythm band, cutting the picture film as required, cutting the master rhythm band correspondingly, and then inscribing the words of a different language on a band with syllables variably spaced corresponding with the cut master band.

5. In a method of producing cinematograph films with synchronized sound and action for a plurality of languages the steps comprising forming an initial rhythm band by inscribing on a band the syllables of a text in one language, spaced to indicate an arbitrary but natural rhythm and tempo and then on the same band corresponding texts in foreign languages with syllables spaced similarly as the first language inscribed on the initial rhythm band, secondly forming a basic rhythm band by passing the initial rhythm band past a guide mark at a uniform speed while each text is simultaneously being read by a person in the language in which the text is written, projecting images of the faces of the persons reading the texts close to each other, comparing for synchronism and coincidence the facial movements of the images of the faces of the persons reading the texts, suitably marking the bands where lack of synchronism occurs, correcting the texts and initial rhythm band at such marked parts, repeating the steps of comparison and correction until the aforesaid facial movements coincide and synchronize, thirdly forming a master rhythm band by recording the rhythm and tempo of one person's interpretation of the corrected text in one language simultaneously with the taking of the picture sequence and inscribing the words of at least one other text on a band with syllables variably spaced as determined by the last said rhythm and tempo, and finally passing the master rhythm band with one of the other texts past a guide mark at a constant speed and recording such other text whereby the speech of a person reading the said other text will synchronize with the movements of the person in the picture sequence.

6. In a method of producing cinematograph films with synchronized sound and action for a plurality of languages the steps comprising forming an initial rhythm band by inscribing on a band the syllables of a text in one language, spaced to indicate an arbitrary but natural rhythm and tempo and then on the same band corresponding texts in foreign languages with syllables spaced similarly as the first language inscribed on the initial rhythm band, secondly forming a basic rhythm band by passing the initial rhythm band past a guide mark at a uniform speed while each text is simultaneously being read by a person in the language in which the text is written, reflecting images of the faces of the persons reading the texts close to each other, comparing for synchronism and coincidence the facial movements of the images of the faces of the persons reading the texts, suitably marking the bands where lack of synchronism occurs, correcting the texts and initial rhythm band at such marked parts, repeating the steps of comparison and correction until the aforesaid facial movements coincide and synchronize, thirdly forming a master rhythm band by recording the rhythm and tempo of one person's interpretation of the corrected text in one language simultaneously with the taking of the picture sequence and inscribing the words of at least one other text on a band with syllables variably spaced as determined by the last said rhythm and tempo, and finally passing the master rhythm band with one of the other texts past a guide mark at a constant speed and recording such other text whereby the speech of a person reading the said other text will synchronize with the movements of the person in the picture sequence.

7. In a method for producing cinematograph films with synchronized sound and action from a pre-existing sound-picture film comprising inscribing on a band the syllables of the text of the pre-existing film in the language employed, spaced to indicate an arbitrary but natural tempo and then inscribing on a band the syllables of a text in a foreign language with syllables spaced similarly as the language initially employed, secondly forming a basic rhythm band by passing the bands past a guide mark at a uniform speed while each text is simultaneously being read by a person in the language in which the text is written, comparing for synchronism and coincidence the facial movements of the persons reading the texts, suitably marking the bands where lack of synchronism occurs, correcting the texts and initial rhythm bands at such marked parts, repeating the steps of comparison and correction until the aforesaid facial movements coincide and synchronize, thirdly forming a master rhythm band for the parts where correction was required, by recording the rhythm and tempo of one person's interpretation of the corrected text in one language simultaneously with the taking of a corrected picture sequence corresponding only with the parts of the texts where correction was required, and inscribing the words of at least one other text on a band with syllables variably spaced as determined by the last said rhythm and tempo, and finally passing the master rhythm band with one of the other texts past a guide mark at a constant speed and recording such other text whereby the speech of a person reading the said other text will synchronize with the movements of the person in the corresponding corrected part of the picture sequence.

8. The method for producing cinematographic films with synchronized sound and action for a plurality of languages according to claim 1 and in which the initial rhythm band is formed by first forming a metrical band by inscribing on a transparent strip the syllables of the text in the one language spaced at equal distances apart, in forming then an initial rhythm band by projecting the inscribed syllables on a photo-sensitive strip so that the syllables are printed thereon, the photo-sensitive strip and metrical band being moved relatively during the projection, the rate of relative movement being controlled to indicate by the resulting varied spacing between the syllables on the photo-sensitive strip an arbitrary but natural rhythm and tempo of the text, said control being effected manually or electrically by rhythmic pulses varying in duration as determined by the rhythm and tempo of the arbitrary but natural rendition of the text.

9. In apparatus for producing initial rhythm bands of the kind described, a diaphragm having an aperture, a drum for passing a blank photo-sensitive strip in one direction past said aperture, a translucent band on which syllables are inscribed metrically spaced, means for successively moving the inscribed syllables at varying intervals of time into position to be focussed on said aperture, means for controlling the time of movement of said syllables, and a shutter for normally closing said aperture and for opening it each time a syllable is brought in position for focussing, the opening of said shutter being controlled by the means which controls the time at which the syllables are moved in position for focussing.

10. Apparatus according to claim 9 and in which the means for controlng the time intervals in which the syllables are brought into position for focussing includes a relay operated by speech-controlled currents.

11. In apparatus for producing initial rhythm bands of the kind described, a diaphragm having an aperture, a drum for passing a blank photo-sensitive strip in one direction past said aperture, a translucent band on which syllables are inscribed metrically spaced, means for successively moving the translucent band longitudinally oppositely to the photo-sensitive strip, means for controlling the longitudinal movement of the translucent strip so that the inscribed syllables are moved into position to be focussed on said aperture at varying intervals of time, and a shutter for normally closing said aperture and for opening it each time a syllable is brought in position for focussing, the opening of said shutter being controlled by the means which controls the time at which the syllables are moved in position for focussing.

12. Apparatus according to claim 9 and an auxilary lamp for producing a horizontal line on the blank band between two syllables to indicate that the sound is prolonged.

CARL ROBERT BLUM.